United States Patent
Kruse et al.

(10) Patent No.: US 11,589,244 B2
(45) Date of Patent: Feb. 21, 2023

(54) CONFIGURING WIRELESS SENSOR NETWORK PATHS

(71) Applicant: NOKIA TECHNOLOGIES OY, Espoo (FI)

(72) Inventors: Johanna Kruse, Stuttgart (DE); Silvio Mandelli, Tamm (DE); Saeed Reza Khosravirad, Mountainside, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/490,314

(22) Filed: Sep. 30, 2021

(65) Prior Publication Data

US 2022/0110003 A1 Apr. 7, 2022

(30) Foreign Application Priority Data

Oct. 1, 2020 (FI) ...................... 20205962

(51) Int. Cl.
*H04W 16/18* (2009.01)
*H04W 84/18* (2009.01)

(52) U.S. Cl.
CPC ............ *H04W 16/18* (2013.01); *H04W 84/18* (2013.01)

(58) Field of Classification Search
CPC ..... H04L 67/1051; H04L 67/52; H04L 12/10; H04W 40/32; H04W 88/04; H04W 76/10; H04W 72/085; H04W 76/14; H04W 72/048; H04W 40/02; H04W 84/18; H04B 7/15507; Y02D 30/70

See application file for complete search history.

(56) References Cited

U.S. PATENT DOCUMENTS

2010/0085903 A1 4/2010 Pandey et al.
2017/0223717 A1 8/2017 Athani

OTHER PUBLICATIONS

Extended European Search Report dated Mar. 7, 2022 corresponding to European Patent Application No. 21199683.0.
Xiaobo Tan et al., "QSDN-WISE: A New Qos-Based Routing Protocol for Software-Defined Wireless Sensor Networks," IEEE Access, vol. 7, May 19, 2019, pp. 61070-61082, XP011726502.
B. Smitha et al., "Software defined network for conservation of energy in wireless sensor network," 2017 International Conference on Energy, Communication, Data Analytics and Soft Computing (ICECDS), IEEE, Aug. 1, 2017, pp. 591-596, XP033359832.

*Primary Examiner* — Jung Liu
(74) *Attorney, Agent, or Firm* — Squire Patton Boggs (US) LLP (57) ABSTRACT

To configure a wireless sensor network, a sink node receives from nodes first reports, a first report from a node indicating quality of service requirement of the node and battery information of the node, and second reports, a second report from a node indicating at least a signal strength of one signal received from another node. The information in the first reports and in the second reports are used for determining paths from the nodes to the sink node, wherein a path of a node is either a direct link from the node to the sink node or the path comprises at least one node acting as a cluster head between the node and the sink node.

20 Claims, 7 Drawing Sheets

CONFIGURING WIRELESS SENSOR NETWORK PATHS

TECHNICAL FIELD

Various example embodiments relate to wireless communications and, particularly, to configuring paths in a wireless sensor network.

BACKGROUND

Wireless communication systems are under constant development. For example, wireless sensor networks (WSN), where a large number of sensors measure their environment and send their data to a sink node, where data is processed, have grown considerably in recent years in different applications including health, environment, and self-driving vehicle technologies, for example. The wireless sensor networks should be able to operate with heterogeneity of sensors or different quality of service requirements.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

An aspect provides an apparatus comprising at least one processor; and at least one memory including computer program code, the at least one memory and computer program code being configured to, with the at least one processor, cause the apparatus at least to perform: acting as a sink node; receiving from nodes first reports, a first report from a node indicating quality of service requirement of the node and battery information of the node; receiving from the nodes second reports, a second report from a node indicating at least a signal strength of one signal received from another node; using information in the first reports and in the second reports to determine paths from the nodes to the apparatus, wherein a path of a node is for transmitting data from the node to the apparatus and the path is either a direct link from the node to the apparatus or the path comprises at least one node acting as a cluster head between the node and the apparatus.

In an embodiment, the at least one memory and computer program code are configured to, with the at least one processor, cause the apparatus further to perform: selecting amongst the nodes cluster heads per a depth; assigning the nodes initially to cluster heads based on the second reports; updating the initial assignments of nodes to fulfil latency and reliability requirements received in the first reports; and causing informing the nodes at least on their cluster heads.

In an embodiment, the at least one memory and computer program code are configured to, with the at least one processor, cause the apparatus further to perform selecting the cluster heads based on the first reports.

In an embodiment, the at least one memory and computer program code are configured to, with the at least one processor, cause the apparatus further to perform: calculating at least a metric value per a node based on at least residual energy and maximum energy of the node obtained using battery information received from the node in a first report; and selecting the cluster heads using metric values.

In an embodiment, the at least one memory and computer program code are configured to, with the at least one processor, cause the apparatus further to perform: checking, when updating the initial assignment of nodes to cluster heads, whether a number of hops in a path of a node is bigger than a number of hops indicated for latency in the quality of service requirement of the node in the first report; in response to the number of hops in the path being bigger than the number of hops indicated for latency, re-assigning the node to a new cluster head via which the number of hops is not bigger than the number of hops indicated for latency, the new cluster head being selected amongst cluster heads in the same depth based on the second reports.

In an embodiment, the at least one memory and computer program code are configured to, with the at least one processor, cause the apparatus further to perform: selecting after the initial assignment of nodes a new cluster head candidate; receiving from nodes third reports, a third report from a node indicating estimated battery consumption of the node; determining a total consumption with the assigned cluster head and a total consumption with the new cluster head candidate; and selecting the cluster head with the smaller total consumption to be the cluster head.

In an embodiment, the at least one memory and computer program code are configured to, with the at least one processor, cause the apparatus further to perform selecting nodes indicating non-limited energy in their first reports as cluster heads connected directly to the sink.

An aspect provides an apparatus comprising: at least one power unit; at least one processor; and at least one memory including computer program code, the at least one memory and computer program code being configured to, with the at least one processor, cause the apparatus at least to perform: acting as a node configured to transmit data to a sink node; causing sending first reports to the sink node, a first report indicating quality of service requirement of the apparatus to transmit the data to the sink node and battery information of the at least one power unit; and causing sending second reports to the sink node, a second report indicating at least a signal strength of a signal received from another apparatus.

In an embodiment, the at least one memory and computer program code are configured to, with the at least one processor, cause the apparatus further to perform causing adding to the second report a list of signal strengths with corresponding apparatuses.

In an embodiment, the battery information comprises one or more of a total battery capacity, a current battery status, a battery capability, battery balance, and an estimated battery consumption.

An aspect provides a method comprising: acting as a sink node; receiving from nodes first reports, a first report from a node indicating quality of service requirement of the node and battery information of the node; receiving from the nodes second reports, a second report from a node indicating at least a signal strength of one signal received from another node; using information in the first reports and in the second reports to determine paths from the nodes to the apparatus, wherein a path of a node is for transmitting data from the node to the apparatus and the path is either a direct link from the node to the apparatus or the path comprises at least one node acting as a cluster head between the node and the apparatus.

An aspect provides a method comprising: acting as a node configured to transmit data to a sink node; causing sending first reports to the sink node, a first report indicating quality of service requirement of the apparatus to transmit the data to the sink node and battery information of the at least one power unit; and causing sending second reports to the sink node, a second report indicating at least a signal strength of a signal received from another apparatus.

An aspect provides a computer program comprising instructions for causing an apparatus to perform at least one of a first process and a second process, wherein the first process comprises the following: acting as a sink node; using information in first reports received from nodes, a first report from a node indicating quality of service requirement of the node and battery information of the node, and in second reports received from the nodes, a second report from a node indicating at least a signal strength of one signal received from another node, to determine paths from the nodes to the apparatus, wherein a path of a node is for transmitting data from the node to the apparatus and the path is either a direct link from the node to the apparatus or the path comprises at least one node acting as a cluster head between the node and the apparatus; and wherein the second process comprises the following: acting as a node configured to transmit data to a sink node; causing sending first reports to the sink node, a first report indicating quality of service requirement of the apparatus to transmit the data to the sink node and battery information of the at least one power unit; and causing sending second reports to the sink node, a second report indicating at least a signal strength of a signal received from another apparatus.

An aspect provides a computer readable medium comprising program instructions for causing an apparatus to perform at least one of a first process and a second process: wherein the first process comprises the following: acting as a sink node; using information in first reports received from nodes, a first report from a node indicating quality of service requirement of the node and battery information of the node, and in second reports received from the nodes, a second report from a node indicating at least a signal strength of one signal received from another node, to determine paths from the nodes to the apparatus, wherein a path of a node is for transmitting data from the node to the apparatus and the path is either a direct link from the node to the apparatus or the path comprises at least one node acting as a cluster head between the node and the apparatus; and wherein the second process comprises the following: acting as a node configured to transmit data to a sink node; causing sending first reports to the sink node, a first report indicating quality of service requirement of the apparatus to transmit the data to the sink node and battery information of the at least one power unit; and causing sending second reports to the sink node, a second report indicating at least a signal strength of a signal received from another apparatus.

In an embodiment, the computer readable medium is a non-transitory computer readable medium.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
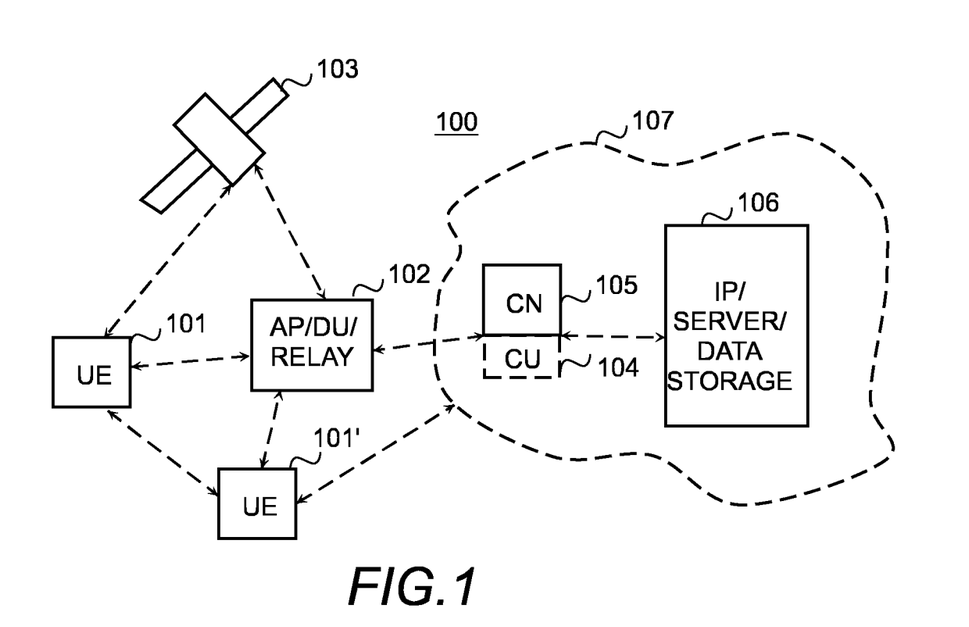
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE, 5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
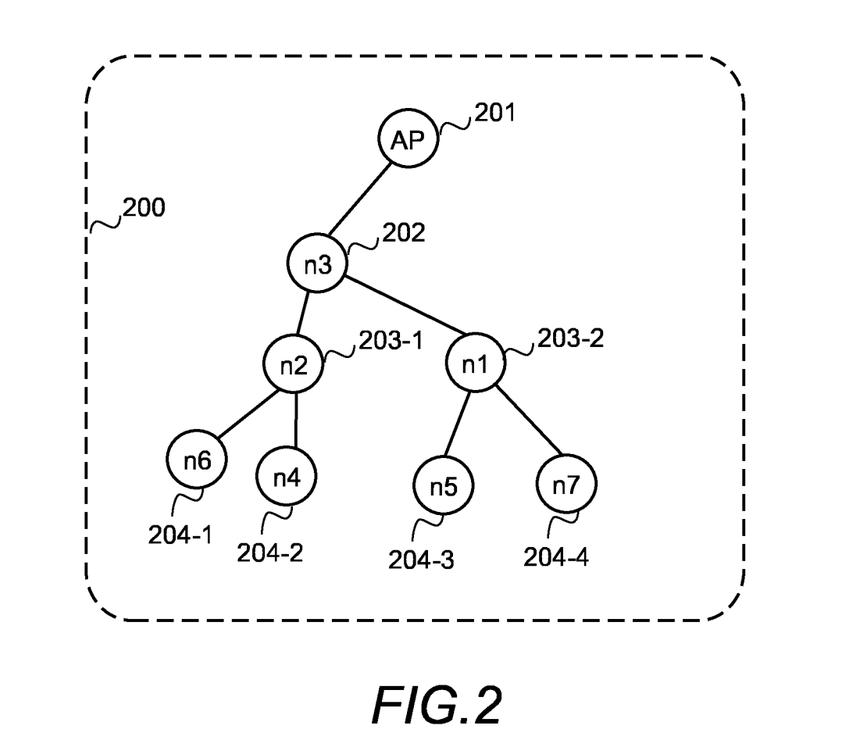
FIG. 2 illustrate an exemplified wireless sensor network.

FIG. 2 illustrates a highly simplified example of a wireless sensor network 200 to explain basic elements in the wireless sensor network. Typically a wireless sensor network 200 contains hundreds of thousands of nodes. A wireless sensor network can be defined as a network of devices (sensors, sensor nodes) that can communicate data gathered from a monitored field through wireless links. For that purpose a node (a sensor node) is equipped with sensing and computing devices, transceivers and power components. A sensor node may be able to change its location. In a three hierarchy network, like the one illustrated in FIG. 2, the data may be forwarded through multiple sensor nodes to a common destination of all data collected by sensor nodes in the wireless sensor network, the common destination being called a sink node. The sink node may be a gateway between the wireless sensor network and another network or connected to a gateway between the wireless sensor network.

Referring to FIG. 2, in the illustrated example an access point (AP), which may be a base station or gNB, for example, is the sink node 201. Further, in the illustrated example the depth of the wireless sensor network is 2, meaning that there are cluster heads 202 connected directly to the sink node 201, and cluster heads 203-1, 203-2 connected via one cluster head 202 to the sink node 201. A cluster head 202, 203-1, 203-2 is a sensor node that gathers data from its child sensor node(s) and sends the gathered data together with data it captured towards the sink. In other words, a cluster head is configured to collect the sensor data, aggregate it and send it to the sink node. Remaining nodes 204-1, 204-2, 204-3, 204-4, i.e. sensor nodes that are not cluster heads or the sink node, are connected to either one of the cluster heads or the sink node. In the illustrated example of FIG. 2, two of the remaining nodes 204-1, 204-2 are connected to the same cluster head 203-1, and the other two of the remaining nodes 204-3, 204-4 are connected to another cluster head 203-2. It should be appreciated that the wireless sensor network may not be as symmetrical as the wireless sensor network illustrated in FIG. 2.

The cluster head 203-1 may be called a parent node (father node) for the sensor nodes 204-1, 204-2, and the cluster head 202 a grandparent node (grandfather node) for the sensor nodes 204-1, 204-2. Correspondingly, the sensor node 204-1 is a child node (son node) for the cluster head 203-1, and the cluster head 203-1 is in turn a child node (son node) for the cluster head 202.

In the illustrated example, nodes 204-1, 204-2, 204-3, 204-4 have three hops to the sink node 201, the nodes 203-1, 203-2 have two hops to the sink node 201, and the node 202 has one hop to the sink node.

Figure 3:
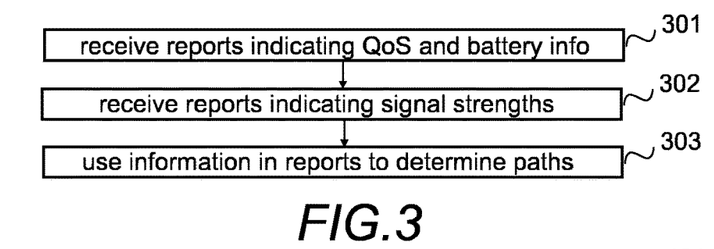
FIGS. 3 to 10 illustrate different examples of functionalities of a sink node.

FIG. 3 illustrates an example functionality of a sink node, i.e. an apparatus configured to act as the sink node and configured to configure a wireless sensor network whose sink node the apparatus is.

Referring to FIG. 3, to configure a wireless sensor network having heterogeneous nodes with different quality of service requirements and/or different battery capabilities without any fixed location, two kinds of reports are received in the sink node from the nodes: reports indicating quality of service requirement of a node and battery information of the node (block 301), and reports indicating at least a signal strength of one signal received from another node (block 302). The sink node is configured to use (block 303) information in the received reports to determine paths from the nodes to the sink node so that the quality requirements, battery information and signal strength are taken into account. A path, that will be used by the node to transmit (send) data to the sink node, may be a direct link between the sink node and the node, or the path may comprise at least one node acting as a cluster head between the node and the sink node. In other words, the received information is used to determine configuration of the wireless sensor network by the apparatus acting as a sink node.

Figure 4:
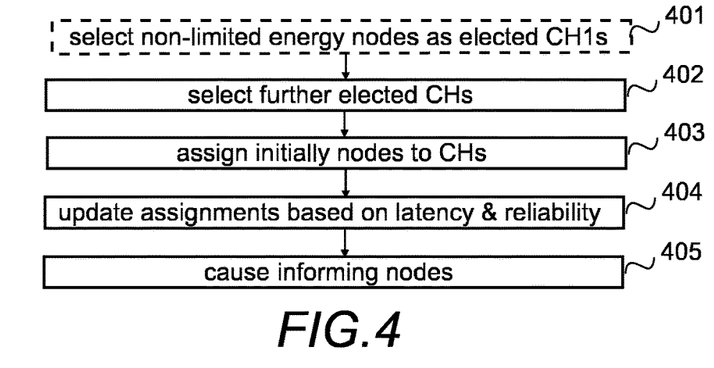

FIG. 4 illustrates an example how the received information may be used by the sink node to configure the wireless sensor network.

Referring to FIG. 4, in the illustrated implementation, based on battery information, those sensor nodes, which have non-limited (infinitive) energy, are selected in block 401 to be elected cluster heads of depth 1 (CH1), i.e. cluster heads having a direct link to the sink node. In another implementation, one or more sensor nodes having non-limited energy may be elected to be cluster head(s) of another depth/other depths. Then further elected cluster heads are selected in block 402 to be elected cluster heads, the selection being based on one or more metrics calculated using at least the battery information. However, in some other implementation no block 401 is performed but all elected cluster heads are selected based on the one or more metrics.

Then all sensor nodes, except a cluster head, that have responded to a cluster head pilot (pilot signal transmitted) by sending cluster head related information to the sink node are initially assigned in block 403 to the cluster head. This initial assigning is performed per a cluster head.

The initial assignments are then updated in block 404, using signal strength information and quality of service requirements, for those sensor nodes whose latency requirements and/or reliability requirements are not met, when linked to the initially assigned cluster head(s) by reassigning them to other cluster heads.

When the configuration is ready, informing sensor nodes accordingly is caused in block 405. The nodes are informed on their cluster head (which may be the sink node), and if a sensor node is also a cluster head, on sensor node(s) directly linked to the cluster head.

In a further embodiment, before block 401, the quality of service requirements are taken into account to assign sensor nodes directly to the sink node. For example, sensor nodes having latency requirement of one hop are directly connected to the sink node, and such sensor nodes may be, but not necessarily are, selected elected cluster heads of depth 1 in block 402.

The above processes may be performed periodically and/or triggered by a beacon report (a cluster head may be configured to periodically transmit a beacon and nodes are configured to measure and report received signal strength of the beacon to the sink node) and/or in response to the number of nodes in the wireless sensor network changing, for example because of one or more new nodes entering and/or one or more nodes leaving the wireless sensor network.

In an implementation, a node having ultra reliable low latency communications as a quality of service requirements may be assigned to have a direct link to the sink node, without assigning it as cluster head with depth 1, to maintain its availability and to maintain any ongoing communications which happens when the network is reconfigured.

Figure 5:
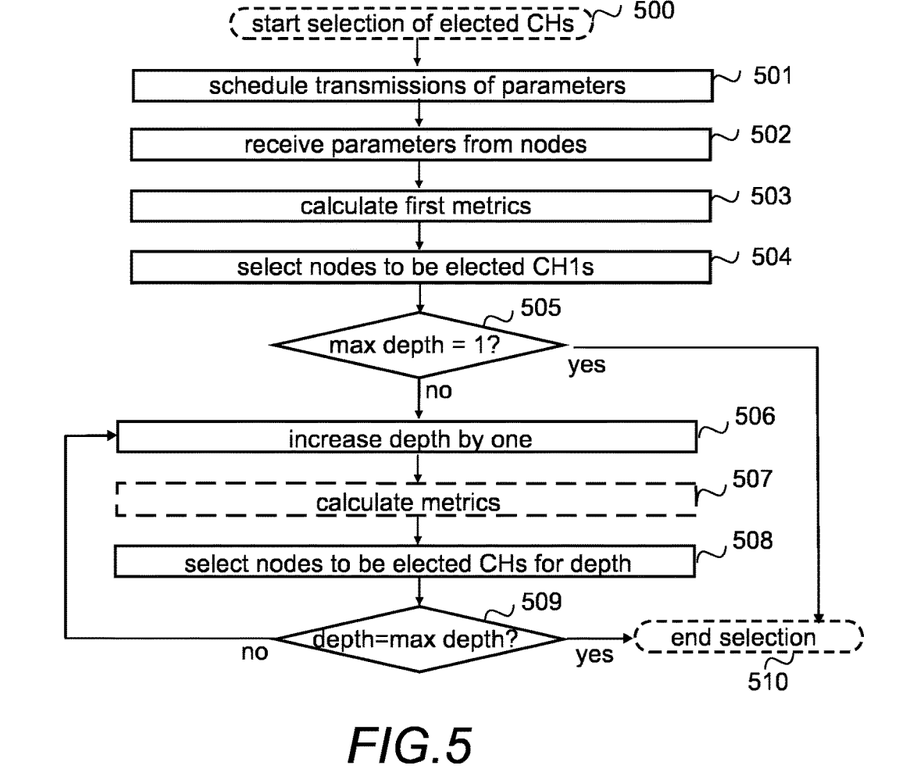

FIG. 5 illustrates in more detail one example how selection of elected cluster heads may be performed. In the example it is assumed, that a maximum depth of the sensor network has been predetermined, and a total (maximum) number of cluster heads per a cluster depth, or a target total elected number of cluster heads per a cluster depth have been predetermined. For example, for a cluster depth i the number of target cluster heads may be 21.

Referring to FIG. 5, when selection of elected cluster heads is started in block 500, for example because a predetermined time interval after the previous configuration has lapsed, information on at least battery capabilities of the sensor nodes is needed. The information may be given by parameters, like residual energy and received signal strength indicator. Optionally also information on quality of service requirements, e.g. parameters indicating latency requirements and/or reliability requirements may be requested and received. Therefore, transmission of the information, i.e. corresponding parameters, from the sensor nodes to the sink node is scheduled in block 501. The scheduling includes causing sending requests and reporting allocations. The parameters are received in block 502 as scheduled. Process of blocks 501 and 502 may be called "Metrics Tx and Reporting allocation".

Using the received parameters, first metrics are calculated in block 503. For example, per a sensor node i following metric value $M_i$ may be calculated:

$$M_i = \frac{\text{residual energy of node}}{\text{maximum energy of node}} * \frac{1}{d_n}$$

wherein $d_n$ is a physical distance to the parent node, which when depth is one, is the sink node. The physical distance may be estimated based on the received signal strength indicator.

When the first metrics have been calculated, the total number of cluster heads for depth 1, i.e. CH1s, are selected in block 504. The nodes may be selected according to the first metric order. For example, the nodes may be ordered according to the value of the first metric in a descending order, and then nodes are selected, starting from the one having the highest value of the first metric until the number of elected cluster heads is the same as the total elected number of cluster heads. In another implementation, the required number N of nodes, i.e. the number resulting to the total elected number of cluster heads, are selected so that a within the node set a node may be extracted N times and each node is extracted with a probability proportional to its metric.

After that it is checked in block 505, whether the maximum cluster depth of the wireless sensor network is 1. If not (block 505: no), the depth value is increased in block 506 by one, and then depending on an implementation, the same metric as used for the previous cluster depth, or a different metric is used. If different metrics is used, metrics are calculated in block 507 for the sensor nodes that were not selected to be cluster heads. For example, for a cluster depth 2 following metrics may be used:

$$M_i = \frac{\text{residual energy of node}}{\text{maximum energy of node}} * \text{density}$$

wherein the density may be based on a subset of a cluster size. For example, ¹⁄₁₀ of the cluster size may be taken and its density, for example expressed as a number of nodes per square meter, is calculated, and used in calculations of the metric. It should be appreciated that ¹⁄₁₀ is a configurable parameter.

Then as many sensor nodes as is the maximum number of cluster heads for the depth i are selected in block 508 to be elected cluster heads. The selection may be performed using either one of the ways described above with block 504, regardless of how the selection is performed at block 504.

After that it is checked in block 509, whether the cluster depth is the same as the maximum cluster depth. If not (block 509: no), the process returns to block 506 to increase the depth. If the cluster depth is the maximum depth (block 509: yes), the selection process of cluster heads is ended in block 510.

The selection process is also ended in block 510, if the maximum depth is 1 (block 505: yes), without performing blocks 506 to 509.

Figure 6:
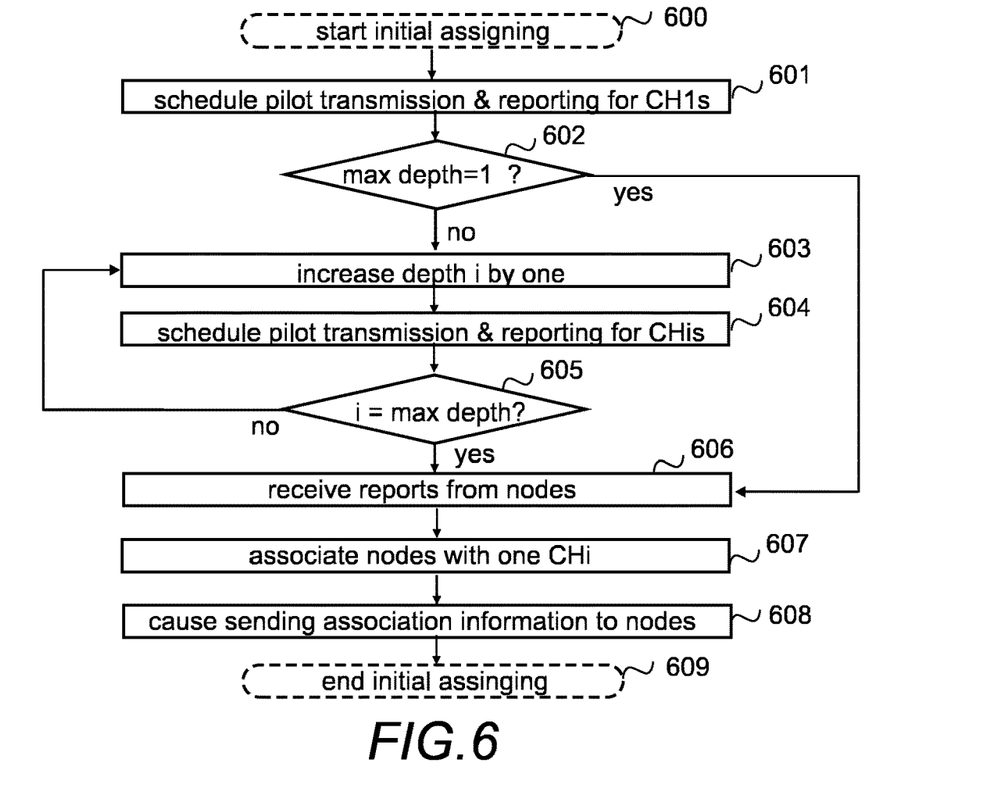

FIG. 6 illustrates in more detail one example how initial assignment of sensor nodes to elected cluster heads may be performed in the sink node. In the example it is assumed that maximum depth of the wireless sensor network, i.e. cluster depth, has been predetermined.

Referring to FIG. 6, when initial assigning is started, for example because selection process ended, pilots (transmissions of pilots) and reporting for elected cluster heads in depth 1 is scheduled in block 601. Block 601 also includes, per an elected cluster head, that its election information, pilot signal transmission and reporting allocation is signaled to the cluster head. (Pilot is signaled to all sensor nodes from the cluster head, including the other cluster heads.)

After that it is checked in block 602, whether the maximum cluster depth of the wireless sensor network is 1. If not (block 602: no), the depth value i is increased in block 603 by one, and then process corresponding to process described with block 601 is performed in block 604 for cluster heads in depth i, ie for CHis. It is checked in block 605, whether the cluster depth i is the same as the maximum cluster depth. If not (block 605: no), the process returns to block 603 to increase the depth.

If the cluster depth is the maximum depth (block 605: yes), reports from sensor nodes hearing the pilot signals are received in block 606, (they may be received during scheduling), a report indicating either directly a cluster head or indirectly a cluster head by containing a list of cluster heads with indication of corresponding signal strengths, for example received signal strength indicators.

Based on the received reports, sensor nodes are associated in block 607 to one cluster head per a sensor node. In other words, a sensor node is associated with one cluster head CHi but a plurality of sensor nodes may be associated with one cluster head CHi. If the report contains only one cluster head, or no other reports than one reporting a cluster head is received from a sensor node, the sensor node is assigned to the cluster head. However, if a list is received, the sink node selects the best cluster head for a sensor node, based on the information on the list. In principle, a sensor node is assigned to the lowest possible level (biggest depth) possible. Then sending association information to sensor nodes is caused in block 608 and initial assigning process is ended in block 609. The association information informs a sensor node its cluster head, and if the sensor node is a cluster head, the association information informs also child nodes. After associating interested nodes with one cluster head CHi in block 608.

If the maximum depth is 1 (block 602: yes), the process proceeds directly to block 606 to receive reports.

In an embodiment, a cluster head may have a parameter defining a maximum number of child nodes. If such a parameter exists, the sink node uses the parameter when associating sensor nodes in block 607.

In another implementation, scheduling pilots and reporting is performed in an opposite order, starting from the maximum depth.

Figure 7:
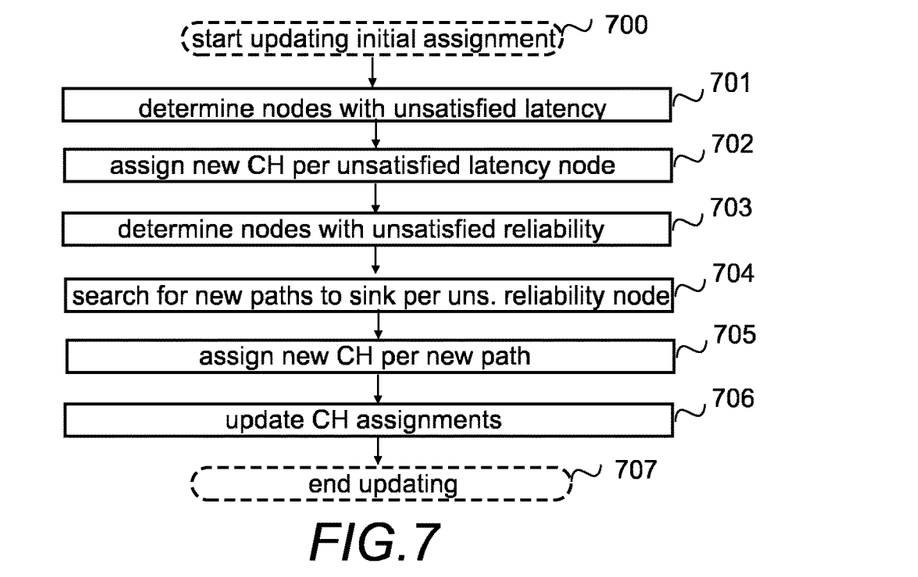

FIG. 7 illustrates one example how initial assignments of cluster heads may be updated by the sink node performing a quality of service check which take into account latency and reliability requirements. It should be appreciated that the quality of service check may be performed also when the initial assignment is performed using some other mechanism than the above described once, for example using a low energy adaptive clustering hierarchy (LEACH) mechanism. Use of other mechanism may require requesting from the nodes the quality of service and/or signal strength information. However, below it is assumed that quality of service requirements and signal strength information is available at the sink node.

Referring to FIG. 7, when updating of initial assessment starts in block 700, for example because the initial assessment procedure ended, sensor nodes with unsatisfied latency requirements are determined in block 701. A sensor node whose current latency is bigger than its target latency has unsatisfied latency requirements. The target latency has been received in the quality of service requirements the node reported to the sink node, and it may have been given as a number of hops from the node to the sink node, and/or the current latency may be estimated using an estimated time/hop and the number of hops. Then, per an unsatisfied latency sensor node, a new cluster head, for example a parent of the current cluster head, is assigned. Further, sensor nodes with unsatisfied reliability requirements are determined in block 703. A sensor node whose current reliability is smaller than its target reliability has unsatisfied reliability requirements. The target reliability has been received in the quality of service requirements, and indicates how many independent paths from the node to the sink node there should exits. Then, one or more new paths from a sensor node to the sink are searched for in block 704 per an unsatisfied reliability sensor node, and if a new path is found, a new cluster head is assigned in block 705 per a new path to the sensor node. In another implementation, if there are two or more new paths, the best one is selected and a new cluster head assigned correspondingly. A new path is a path not containing at least the same parent node as the initially assigned path. In some implementations a new path is a new independent path that does not contain any of the intermediate nodes between the sensor node and the sink node that are in an already assigned path. Once the latency and reliability issues are solved, cluster head assignments are updated in block 706 by causing sending association information to at least sensor nodes having new cluster head(s), to the new cluster head(s) and old cluster head(s).

Figure 8:
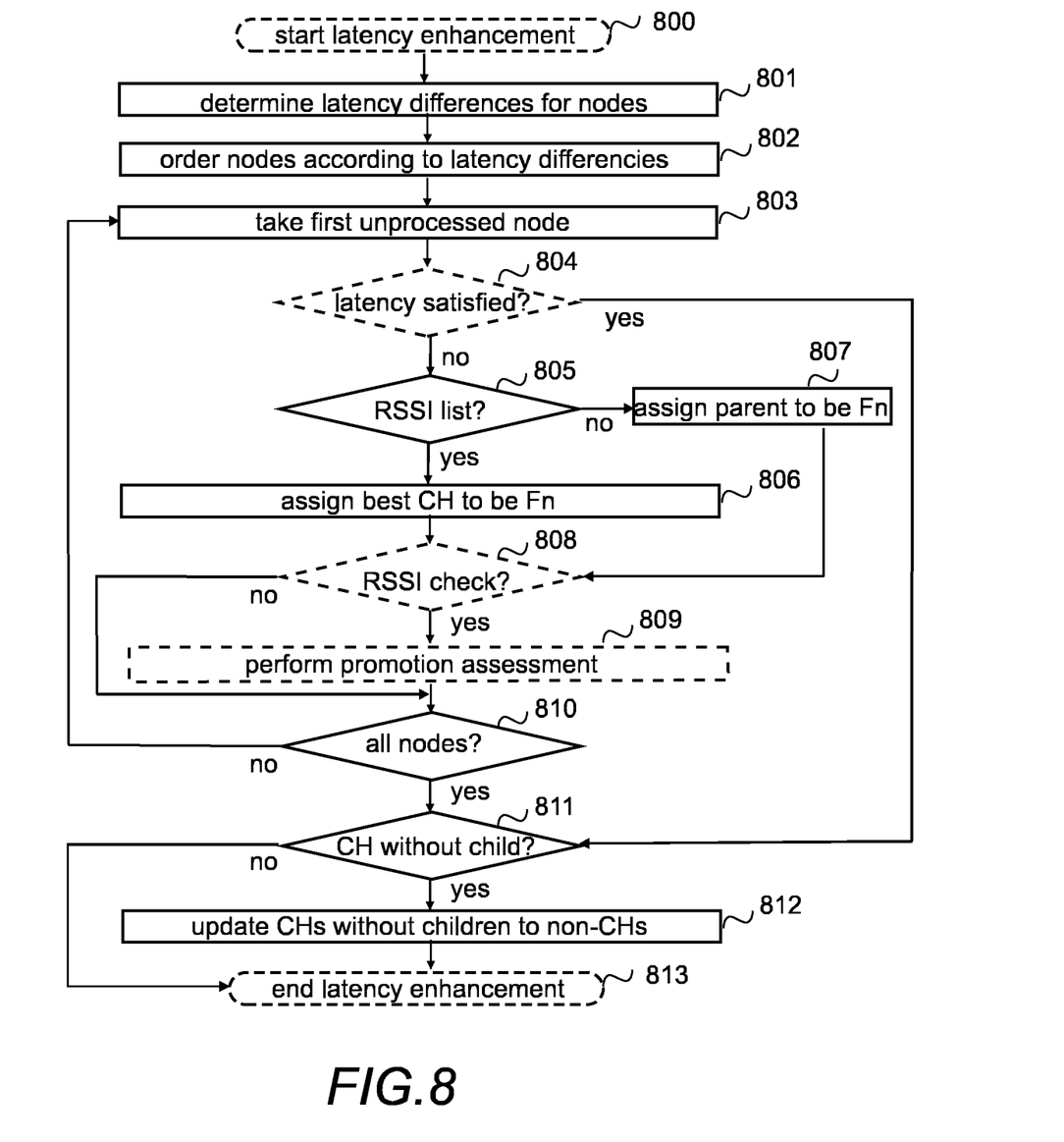

FIG. 8 illustrates in more detail one example how to take latency requirements into account. More precisely, the example illustrates in detail what may be performed in blocks 701 and 702 of FIG. 7. The process may be called latency enhancement.

Referring to FIG. 8, when the latency enhancement is started in block 800, latency differences between the current latency and the target latency is determined in block 801 for all sensor nodes. Then the sensor nodes are ordered in block 802 to a list according to their latency differences, the one having the biggest difference being first in the list. Then a first unprocessed sensor node in the list is taken in block 803 to be processed. First it is checked in block 804, whether the latency is satisfied, i.e. whether the current latency is not bigger than the target latency. If the latency is not satisfied (block 804: no), it is checked in block 805, whether there is signal strength information on other cluster heads available, for example whether the sensor node reported an RSSI (received signal strength indicator) list. If there is (block 805: yes), the best cluster head in a depth "number of target latency hops—1" is assigned in block 806 to be a parent node Fn. The best cluster head is the one with the highest signal strength (highest RSSI). If there is not signal strength information on other cluster heads available (block 805: no), for example no RSSI list, a direct parent/grandparent of the current cluster head in the depth "number of target latency hops—1" is assigned in block 807 to be the new parent node Fn.

In the illustrated example, after the new parent node Fn has been assigned (block 806 or block 807) it is checked in block 808, whether an RSSI check can be run for the node. The RSSI check means that RSSI information from the node to surrounding nodes is available or can be gathered. If the RSSI check can be run (block 808: yes), promotion assessment, which results to information whether the node under processing can become a new cluster head candidate for the unprocessed nodes, is performed in block 809. Then it is checked in block 810, whether all sensor nodes have been processed. If not (block 810: no), the process returns to block 803 to take the first unprocessed sensor node to be processed.

If the RSSI check cannot be run (block 808: no), the process proceeds to block 810 to check, whether all sensor nodes have been processed.

In another implementation no blocks 808 and 809 are performed, i.e. the process proceeds directly from blocks 806 and 807 to block 810.

If all nodes are processed (block 810: yes), it is checked in block 811, whether there are any initially assigned cluster heads without any children. If there is (block 811: yes), cluster heads without any children are updated in block 812 to be mere sensor nodes, i.e non-cluster heads, and then the latency enhancement ends in block 813. By updating cluster heads that have no children to be mere sensor nodes, battery consumption of the whole wireless sensor network can be reduced.

If there are no initially assigned cluster heads without any children (block 811), the latency enhancement ends (block 813).

If the latency is satisfied (block 804: yes), also latency of remaining sensor nodes in the list is satisfied, and therefore the process may proceed to block 811 to check, whether there are any initially assigned cluster heads without any children.

In another implementation, in block 802 nodes whose latency requirement are not satisfied are listed and nodes whose latency requirement are satisfied are not listed. In the implementation the check in block 804 is omitted.

In a further embodiment, latency of a link is used instead of the number of hops. In the embodiment, latencies of links in the path between the node and the sink are aggregated (calculated together), and the node is moved upwards (promoted) until the aggregated latency is smaller than or equal to the required latency.

For example, using the example illustrated in FIG. 2, a sensor node n7 having initially the sensor node n1 as a cluster head may be reassigned to the cluster node of the sensor node n3.

Figure 9:
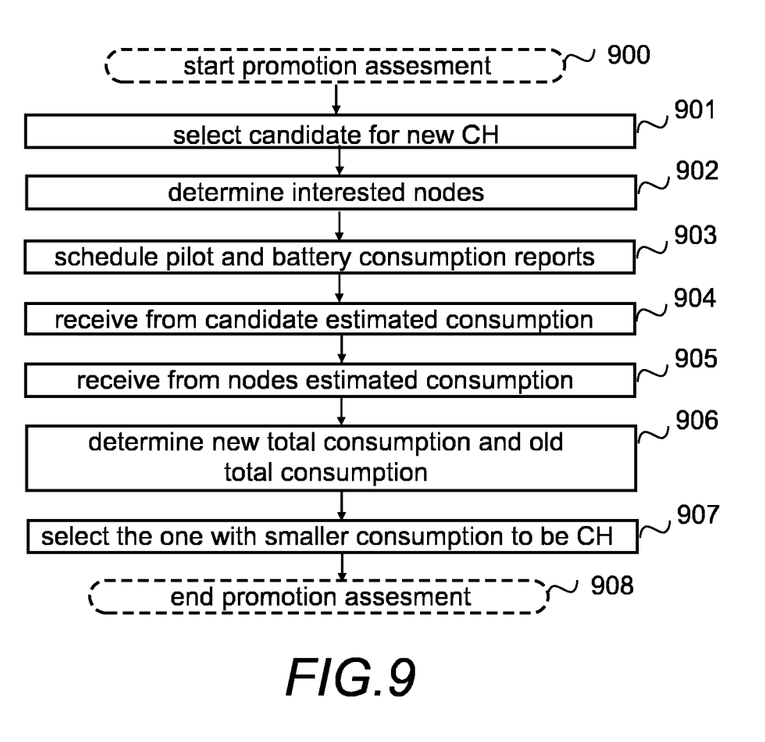

FIG. 9 illustrates in more detail one example how to perform promotion assessment. More precisely, the example illustrates in detail what may be performed in block 809 of FIG. 8. The promotion assessment may be triggered also in response to detecting that a latency requirement of a sensor node cannot be fulfilled with any of the existing cluster heads.

Referring to FIG. 9, the promotion assessment starts (block 900) in the illustrated example by selecting in block 901 the node, which has been taken in block 803 of FIG. 3 to be processed, or which triggered the promotion assessment, a candidate node for a new cluster head. Then interested sensor nodes are determined in block 902 using available or gathered information on signal strengths. Information may be gathered by scheduling the candidate node to send pilot signals and all other sensor nodes to report signal strength information to the sink node. Following criteria may be used in block 902 to determine whether a sensor node is an interested sensor node (i.e. a sensor node which fulfills the criteria):

RSSI between the sensor node and candidate node is higher than RSSI between the sensor node and its current cluster head latency of the candidate node plus latency from the candidate node to the sensor node is smaller than the target latency of the sensor node When the interested nodes have been determined, pilots (transmissions of pilot signal) to the interested nodes and reports from the interested nodes are scheduled in block 903. It should be appreciated that if nodes are not mobile, or are moving slowly (so that the average channel condition remains rather stable), block 903 need not to be performed every time but previous reports may be used.

A report containing at least an estimated battery consumption is received in block 904 from the candidate node, and reports containing estimated battery consumptions from the interested nodes. The report received from the candidate node may also contain information on the number of connected nodes in the embodiment in which the parameter "maximum number of child nodes" is used, to ensure that the maximum number of child nodes is not exceeded.

The received estimated battery consumptions are used in block 906 to determine total battery consumption for a new cluster head path by calculating a sum of battery consumptions of all interested nodes and the candidate node, as well as a sum of battery consumptions of all interested nodes with their current path (old total consumption). Then the path with the smaller battery consumption is selected in block 907, thereby also selecting which one of the candidate cluster head or the current cluster head will be the cluster head (CH). Depending on an implementation, if the candidate node is selected to be the cluster head, the interested nodes, the candidate node and old cluster head(s) may be informed correspondingly at this stage, or later.

Figure 10:
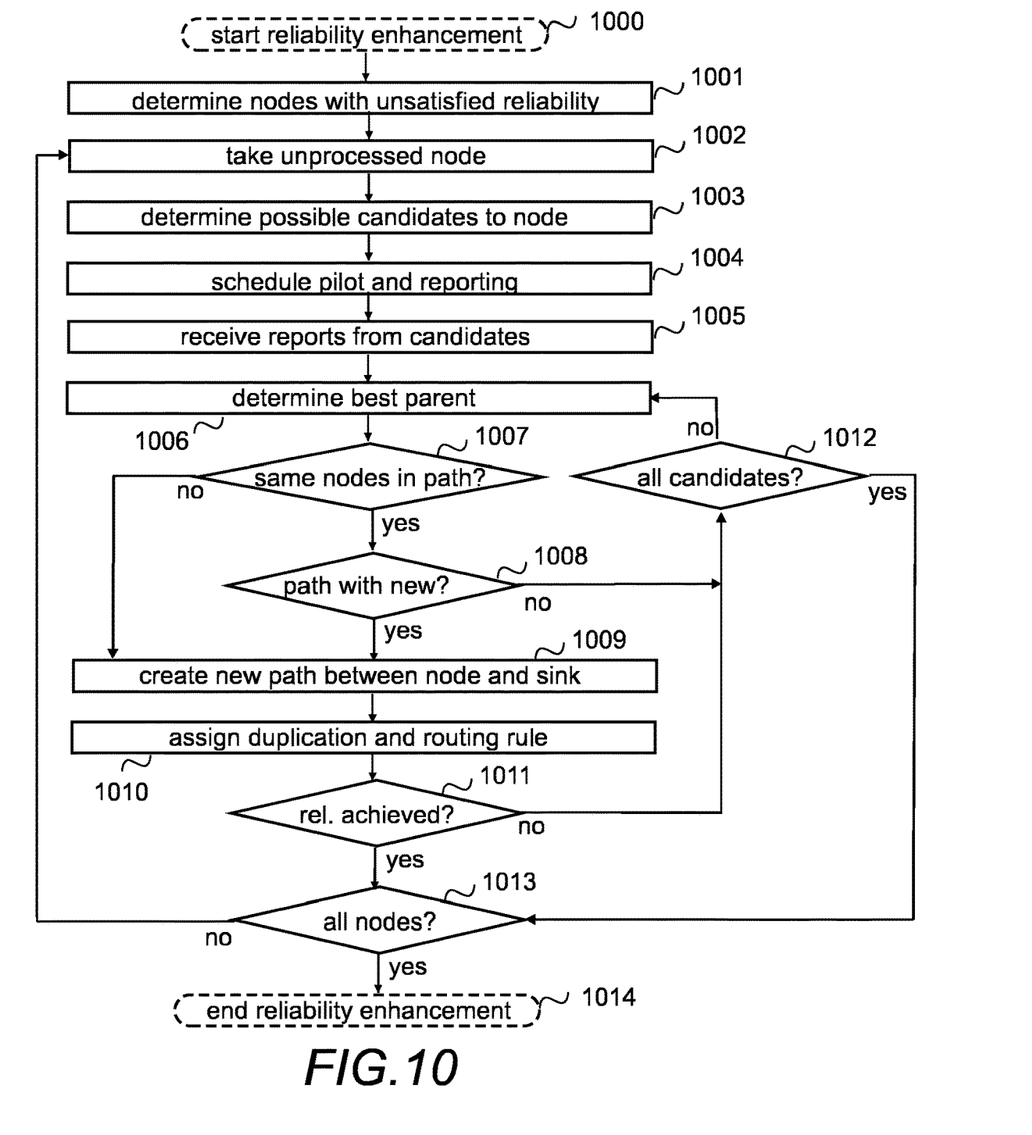

FIG. 10 illustrates in more detail one example how to take reliability requirements into account. More precisely, the example illustrates in detail what may be performed in blocks 703, 704 and 705 of FIG. 7. The process may be called a reliability enhancement. In the illustrated example, the reliability is provided by defining one or more new independent paths between the node and the sink.

The reliability enhancement starts (block) 1000 after the latency enhancement has ended. The process begins with determining in block 1001 sensor nodes with unsatisfied reliability, i.e. sensor nodes whose current reliability is smaller than their target reliability.

Once the sensor nodes with unsatisfied reliability has been determined, an unprocessed sensor node amongst the determined ones is taken in block 1002 to be processed. Possible parent nodes Fns to the sensor node are determined in block 1003. The possible parent nodes depend on the latency requirement of the sensor node. For example, if the latency requirement equals to the current depth i in the number of hops the possible parent nodes need to be on the same depth i−1 than the assigned cluster head, or on a depth smaller than the depth i−1 as long as the possible parent node is not the sink node. In another implementation a possible parent node needs to be on a depth smaller than the depth i−1. If the latency requirement equals to a lower depth m (m<i), the possible parent nodes may be on the depth m−1 or a depth smaller than m−1 as long as the possible parent node is not the sink node.

Then a pilot from the sensor node and reporting the pilot by the parent nodes is scheduled in block 1004. Based on the reports received, the best parent node, i.e. the one reporting the best signal strength, is determined in block 1006. Then it is checked in block 1007, whether the best parent node or any node in the path from the best parent node to the sink is already in an existing path between the sensor node and the sink node. In other words, in the illustrated example a new path is not permitted to use any of sensor nodes already used for the old path of the sensor node.

If there is a node in the path from the best parent node to the sink that already is in an existing path from the sensor node to the sink (block 1007: yes), it is checked in block, whether it is possible to establish a route from the best parent node to the sink that does not pass via a node already in an existing path from the sensor node to the sink. The checking may include performing functionality described with blocks 1003 to 1008, using as the node to whom candidates are determined a node having the node already in an existing path as a cluster head, as many times as needed.

If the best parent node or any node in the path from the best parent node to the sink is not already in an existing path (block 1007: no), or if it is possible to establish a route from the best parent node to the sink that does not pass via a node already in an existing path (block 1008: no), a new independent path is created in block 1009 between the node and sink via the best parent, and duplication and routing rule is assigned in block 1010 to correspond to the new path.

Then it is checked in block 1011, whether the reliability requirement is achieved. If not (block 1011: no), it is checked in step 1012, whether all possible candidates have undergone the checking whether a new independent path can be established. If not (block 1012: no), the process returns to block 1006 to determine the best parent amongst unprocessed parents.

If the reliability requirement is achieved (block 1011: yes), or if all possible candidates have undergone the checking whether a new independent path can be established (block 1012: yes), it is checked in block 1013, whether all sensor nodes determined in block 1001 has been processed. If not (block 1013: no), the process continues to block 1002 to select an unprocessed sensor node. If all sensor nodes with unsatisfied reliability have been processed (block 1013: yes), reliability enhancement end in block 1014.

For example, using the example illustrated in FIG. 2, for a sensor node n4 having path n4-n2-n3-AP, a second path n4-n1-AP may be created as a result of the above process.

Figure 11:
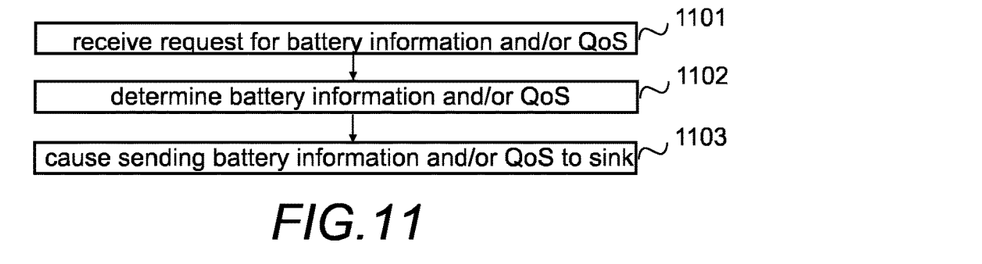
FIGS. 11 to 13 illustrate different examples of functionalities of nodes.
Figure 12:
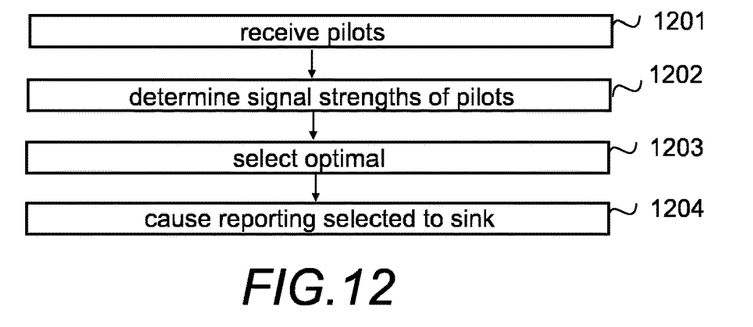
Figure 13:
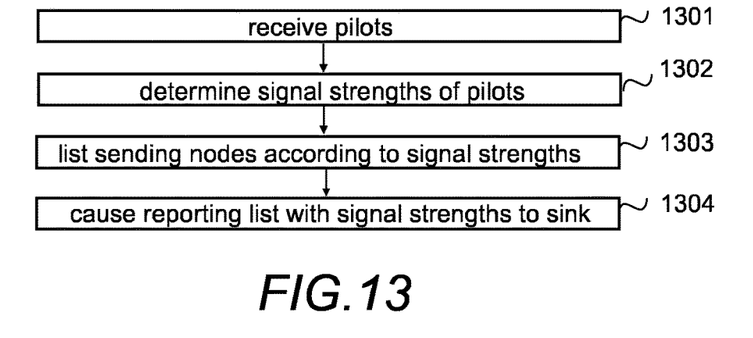

FIGS. 11 to 13 illustrate different reporting related functionalities of nodes in the wireless sensor network.

Referring to FIG. 11, when a request for battery information and/or for quality of service information is received in block 1101, the requested information, i.e. the battery information and the quality of service information is determined in block 1102.

The battery information may be a total battery capacity, a current battery status, which may be given as an absolute battery value (for example, in J or mAh), or as a relative battery value (for example, in percentage), a battery capability or battery balance, for example infinite energy or residual energy and/or maximum energy. A further example of a battery information includes an estimated battery consumption, which may be calculated based on received signal strength including path loss, estimated traffic profile, device circuitry and signal and interference to noise ratio, for example. A cluster head may also add to the battery information the number of connected nodes.

The quality of service information contains or indicates latency requirements and reliability requirements. The quality of service information may be given by a quality of service class, a non-limiting list of examples of which include eMBB (enhanced mobile broadband), URLLC (ultra reliable low latency communications) and mMTC (massive machine type communications). The quality of service information may also indicate required data rate.

After that reporting, i.e. sending, the determined battery information and/or for quality of service information to the sink node is caused in block 1103. The information, i.e. reports, may be send using existing reporting methodologies, for example.

FIGS. 12 and 13 describe different alternative implementations how a node may report pilots transmitted by any other node (s), including the sink node.

Referring to FIG. 12, when a node receives (hears) in block 1201 one or more pilots (pilot signals), it determines, or measures, in block 1202 received signal strengths of the pilots, per a pilot. Based on the signal strengths, an optimal node for a cluster head candidate is selected in block 1203. Usually the optimal node is the one with the best received signal strength of its pilot. Then reporting the node selected in block 1203, usually with its signal strength indicator, to the sink node is caused in block 1204.

Referring to FIG. 13, when a node receives (hears) in block 1301 one or more pilots (pilot signals), it determines, or measures, in block 1202 received signal strengths of the pilots, per a pilot. Based on the signal strengths, the node lists in block 1303 the sending nodes according to the signal strengths. In other words, the pilot sending nodes are arranged to an order of nodes for an optimal node for a cluster head candidate. Usually the order is a descending order starting with the one having the best received signal strength of its pilot. Then reporting the list, or part of the list, created in block 1303, usually with corresponding signal strength indicators, to the sink node is caused in block 1304. In other words, depending on the settings, the whole list or a predetermined number from the beginning of the list are reported to the sink node.

The reporting described with FIGS. 12 and 13 can be used also to report beacons, if beacons are sent.

Even though in the above examples there is only one sink node, it should be appreciated that in case of multiple sink nodes the above examples may run in parallel, sink node-specifically. However, it is possible that a node measures and reports received signal strength of pilots in the same report to the multiple sink nodes.

As can be seen from the above examples, it is possible to configure a wireless sensor network having heterogeneous nodes, the configuration automatically adopting to topology changes to satisfy different latency and reliability requirements of the nodes.

Thanks to electing cluster heads for every depth before assigning nodes to cluster heads, and updating the initial assignment of nodes to the cluster heads, the nodes will be connected to their best possible cluster head.

Further, by taking into account battery information of the nodes, the nodes having the best battery capacity will be cluster heads.

The blocks, related functions, and information exchanges described above by means of FIGS. 3 to 13 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 14:
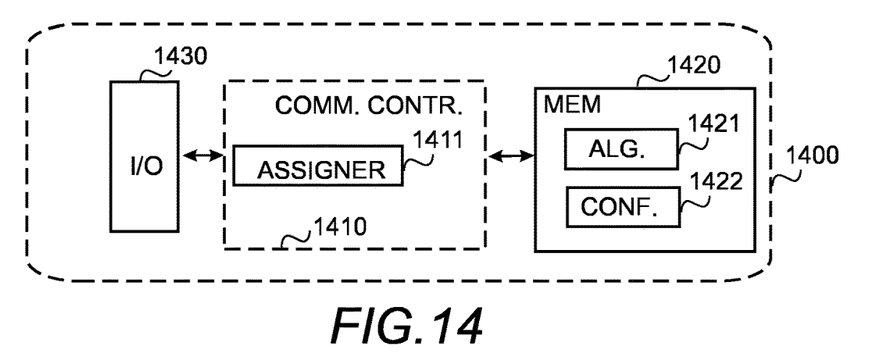
FIGS. 14 and 15 are schematic block diagrams.
Figure 15:
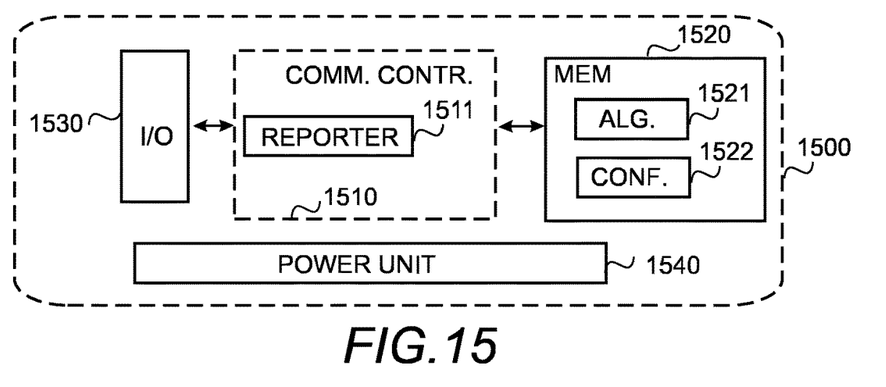

FIGS. 14 and 15 illustrate apparatuses comprising a communication controller 1410, 1510 such as at least one processor or processing circuitry, and at least one memory 1420, 1520 including a computer program code (software, algorithm) ALG. 1421, 1521, wherein the at least one memory and the computer program code (software, algorithm) are configured, with the at least one processor, to cause the respective apparatus to carry out any one of the embodiments, examples and implementations described above. FIG. 14 illustrates an apparatus configured to act as a sink node, and FIG. 15 illustrates an apparatus for a node in the network. The apparatuses of FIGS. 14 and 15 may be electronic devices.

Referring to FIGS. 14 and 15, the memory 1420, 1520 may be implemented using any suitable data storage technology, such as semiconductor based memory devices, flash memory, magnetic memory devices and systems, optical memory devices and systems, fixed memory and removable memory. The memory may comprise a configuration storage CONF. 1421, 1521, such as a configuration database, for at least storing one or more configurations, including network configuration information, for example information on a cluster head. The memory 1421 may further store, at least temporarily, reports comprising lists of received signal strengths with corresponding node information. The memory 1420, 1520 may further store a data buffer for data waiting to be processed (including transmission).

Referring to FIG. 14, the apparatus configured to act as a sink node comprises a communication interface 1430 comprising hardware and/or software for realizing communication connectivity according to one or more wireless and/or communication protocols. The communication interface 1430 may provide the apparatus with communication capabilities to nodes in the wireless sensor network, and possibly also to user devices (terminal devices) camping in one or more cells controlled by the apparatus, as well as communication capabilities towards a wired network. Digital signal processing regarding transmission and reception of signals may be performed in a communication controller 1410. The communication interface may comprise standard well-known components such as an amplifier, filter, frequency-converter, (de)modulator, and encoder/decoder circuitries and one or more antennas.

The communication controller 1410 comprises an assigner processing circuitry 1411 configured to configure a wireless sensor network according to any one of the embodiments/examples/implementations described above. The communication controller 1410 may control the assigner processing circuitry 1411 to schedule reporting, pilot signals and receive reports and to use information in the reports to determine the structure of the wireless sensor network.

In an embodiment, at least some of the functionalities of the apparatus of FIG. 14 may be shared between two physically separate devices, forming one operational entity. Therefore, the apparatus may be seen to depict the operational entity comprising one or more physically separate devices for executing at least some of the processes described with respect to the sink node.

Referring to FIG. 15, the apparatus 1500 may further comprise a communication interface 1530 comprising hardware and/or software for realizing communication connectivity according to one or more wireless communication protocols. The communication interface 1530 may provide the apparatus with communication capabilities with other nodes and the sink node. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1510.

The communication controller 1510 comprises a reporter circuitry 1511 configured to create reports according to any one of the embodiments/examples/implementations described above. The reporter circuitry 1511 may communicate the reports to the sink node through the communication interface 1530.

Referring to FIG. 15, the apparatus 15 further comprises a power unit 1540 configured to supply power for the apparatus to operate. The power unit 1540 may be a rechargeable battery, which may be recharged periodically or be a wired battery, or a non-rechargeable battery, which may be a replaceable battery.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 13 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 3 to 13, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 3 to 13 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
    at least one processor; and
    at least one memory including computer program code, the at least one memory and computer program code configured to, with the at least one processor, cause the apparatus at least to perform:
    acting as a sink node;
    receiving from a plurality of nodes first reports, a first report from a first node indicating quality of service requirement of the first node and battery information of the first node;
    receiving from the plurality of nodes second reports, a second report from a second node indicating at least a signal strength of one signal received from another node;
    using information in the first reports and in the second reports to determine paths from the first and second nodes to the apparatus by selecting amongst the plurality of nodes cluster heads per a depth, assigning the nodes initially to cluster heads based on the second reports, and updating the initial assignments of nodes to fulfil latency and reliability requirements received in the first reports, wherein a path of a given node is for transmitting data from the given node to the apparatus and the path is either a direct link from the given node to the apparatus or the path comprises at least one node acting as a cluster head between the given node and the apparatus; and
    causing informing the nodes at least on their cluster heads.

2. The apparatus according to claim 1, wherein the at least one memory and computer program code configured to, with the at least one processor, cause the apparatus further to perform selecting the cluster heads based on the first reports.

3. The apparatus according to claim 2, wherein the at least one memory and computer program code configured to, with the at least one processor, cause the apparatus further to perform:
    calculating at least a metric value per a node based on at least residual energy and maximum energy of the node obtained using battery information received from the node in a first report; and
    selecting the cluster heads using metric values.

4. The apparatus according to claim 1, wherein the at least one memory and computer program code configured to, with the at least one processor, cause the apparatus further to perform:
    checking, when updating the initial assignment of nodes to cluster heads, whether a number of hops in a path of a node is bigger than a number of hops indicated for latency in the quality of service requirement of the node in the first report;
    in response to the number of hops in the path being bigger than the number of hops indicated for latency, re-assigning the node to a new cluster head via which the number of hops is not bigger than the number of hops indicated for latency, the new cluster head being selected amongst cluster heads in the same depth based on the second reports.

5. The apparatus according to claim 1, wherein the at least one memory and computer program code configured to, with the at least one processor, cause the apparatus further to perform:
  selecting after the initial assignment of nodes a new cluster head candidate;
  receiving from nodes third reports, a third report from a node indicating estimated battery consumption of the node;
  determining a total consumption with the assigned cluster head and a total consumption with the new cluster head candidate; and
  selecting the cluster head with the smaller total consumption to be the cluster head.

6. The apparatus according to claim 1, wherein the at least one memory and computer program code configured to, with the at least one processor, cause the apparatus further to perform selecting nodes indicating non-limited energy in their first reports as cluster heads connected directly to the sink.

7. The apparatus according to claim 1, wherein the battery information comprises one or more of a total battery capacity, a current battery status, a battery capability, battery balance, and an estimated battery consumption.

8. A method, comprising:
  acting as a sink node;
  receiving from a plurality of nodes first reports, a first report from a first node indicating quality of service requirement of the first node and battery information of the first node;
  receiving from the plurality of nodes second reports, a second report from a second node indicating at least a signal strength of one signal received from another node;
  using information in the first reports and in the second reports to determine paths from the first and second nodes to the apparatus by selecting amongst the nodes cluster heads per a depth, assigning the nodes initially to cluster heads based on the second reports, and updating the initial assignments of nodes to fulfil latency and reliability requirements received in the first reports, wherein a path of a given node is for transmitting data from the given node to the apparatus and the path is either a direct link from the given node to the apparatus or the path comprises at least one node acting as a cluster head between the given node and the apparatus; and
  causing informing the nodes at least on their cluster heads.

9. The method according to claim 8, further comprising: selecting the cluster heads based on the first reports.

10. The method according to claim 9, further comprising:
  calculating at least a metric value per a node based on at least residual energy and maximum energy of the node obtained using battery information received from the node in a first report; and
  selecting the cluster heads using metric values.

11. The method according to claim 8, further comprising:
  checking, when updating the initial assignment of nodes to cluster heads, whether a number of hops in a path of a node is bigger than a number of hops indicated for latency in the quality of service requirement of the node in the first report;
  in response to the number of hops in the path being bigger than the number of hops indicated for latency, re-assigning the node to a new cluster head via which the number of hops is not bigger than the number of hops indicated for latency, the new cluster head being selected amongst cluster heads in the same depth based on the second reports.

12. The method according to claim 8, further comprising:
  selecting after the initial assignment of nodes a new cluster head candidate;
  receiving from nodes third reports, a third report from a node indicating estimated battery consumption of the node;
  determining a total consumption with the assigned cluster head and a total consumption with the new cluster head candidate; and
  selecting the cluster head with the smaller total consumption to be the cluster head.

13. The method according to claim 8, further comprising:
  selecting nodes indicating non-limited energy in their first reports as cluster heads connected directly to the sink.

14. The method according to claim 8, wherein the battery information comprises one or more of a total battery capacity, a current battery status, a battery capability, battery balance, and an estimated battery consumption.

15. A computer readable medium comprising program instructions for causing an apparatus to perform at least:
  acting as a sink node;
  using information in first reports received from a plurality of nodes, a first report from a first node indicating quality of service requirement of the first node and battery information of the node, and in second reports received from the plurality of nodes, a second report from a second node indicating at least a signal strength of one signal received from another node, to determine paths from the nodes to the apparatus by selecting amongst the nodes cluster heads per a depth, assigning the nodes initially to cluster heads based on the second reports, and updating the initial assignments of nodes to fulfil latency and reliability requirements received in the first reports, wherein a path of a given node is for transmitting data from the given node to the apparatus and the path is either a direct link from the node to the apparatus or the path comprises at least one node acting as a cluster head between the given node and the apparatus; and
  informing the nodes at least on their cluster heads.

16. The computer readable medium according to claim 15, wherein the computer readable medium comprising program instructions for causing the apparatus further to perform at least:
  selecting the cluster heads based on the first reports.

17. The computer readable medium according to claim 16, wherein the computer readable medium comprising program instructions for causing the apparatus further to perform at least:
  calculating at least a metric value per a node based on at least residual energy and maximum energy of the node obtained using battery information received from the node in a first report; and
  selecting the cluster heads using metric values.

18. The computer readable medium according to claim 15, wherein the computer readable medium comprising program instructions for causing the apparatus further to perform at least:
  checking, when updating the initial assignment of nodes to cluster heads, whether a number of hops in a path of a node is bigger than a number of hops indicated for latency in the quality of service requirement of the node in the first report;

in response to the number of hops in the path being bigger than the number of hops indicated for latency, re-assigning the node to a new cluster head via which the number of hops is not bigger than the number of hops indicated for latency, the new cluster head being selected amongst cluster heads in the same depth based on the second reports.

19. The computer readable medium according to claim 15, wherein the computer readable medium comprising program instructions for causing the apparatus further to perform at least:

selecting after the initial assignment of nodes a new cluster head candidate;

receiving from nodes third reports, a third report from a node indicating estimated battery consumption of the node;

determining a total consumption with the assigned cluster head and a total consumption with the new cluster head candidate; and selecting the cluster head with the smaller total consumption to be the cluster head.

20. The computer readable medium according to claim 15, wherein the computer readable medium is a non-transitory computer readable medium.

* * * * *